(12) United States Patent
Ma et al.

(10) Patent No.: US 11,366,719 B1
(45) Date of Patent: Jun. 21, 2022

(54) METHOD, DEVICE AND COMPUTER PROGRAM PRODUCT FOR STORAGE MANAGEMENT

(71) Applicant: EMC IP Holding Company LLC, Hopkinton, MA (US)

(72) Inventors: Chun Ma, Beijing (CN); Geng Han, Beijing (CN); Baote Zhuo, Beijing (CN); Hongpo Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/204,216

(22) Filed: Mar. 17, 2021

(30) Foreign Application Priority Data

Dec. 4, 2020 (CN) .......................... 202011409033.3

(51) Int. Cl.
*G06F 11/00* (2006.01)
*G06F 11/10* (2006.01)
*G06F 11/30* (2006.01)
*G06F 11/07* (2006.01)

(52) U.S. Cl.
CPC ...... *G06F 11/1076* (2013.01); *G06F 11/0772* (2013.01); *G06F 11/0787* (2013.01); *G06F 11/3034* (2013.01)

(58) Field of Classification Search
CPC ............. G06F 11/1076; G06F 11/0772; G06F 11/0787; G06F 11/3034
See application file for complete search history.

(56) References Cited

U.S. PATENT DOCUMENTS

| 5,452,444 | A | * | 9/1995 | Solomon | G06F 11/1076 714/52 |
| 5,548,711 | A | * | 8/1996 | Brant | G06F 11/2094 714/E11.034 |
| 6,701,452 | B1 | * | 3/2004 | Kinjo | G06F 11/1076 714/6.21 |
| 8,799,705 | B2 | | 8/2014 | Hallak et al. | |
| 8,862,818 | B1 | | 10/2014 | Ozdemir | |
| 10,209,904 | B2 | | 2/2019 | Himelstein et al. | |
| 10,691,354 | B1 | | 6/2020 | Kucherov | |
| 2007/0028045 | A1 | * | 2/2007 | Hung | G06F 3/0689 711/114 |

* cited by examiner

*Primary Examiner* — Philip Guyton
(74) *Attorney, Agent, or Firm* — BainwoodHuang

(57) ABSTRACT

A storage management technique involves: receiving from a requesting node a write request for writing target data into a first target storage space in a redundant array of independent disks (RAID); if a storage device associated with the first target storage space does not fail, acquiring first data stored in the first target storage space and a first parity value corresponding to the requesting node and stored in a parity storage space; determining a target parity value based on the target data, the first data, and the first parity value; and updating a stripe with the target data and the target parity value. Accordingly, locks caused by updating the parity value can be avoided, so that different nodes can perform parallel write to different storage spaces in the same stripe in the RAID.

21 Claims, 5 Drawing Sheets

METHOD, DEVICE AND COMPUTER PROGRAM PRODUCT FOR STORAGE MANAGEMENT

CROSS-REFERENCE TO RELATED APPLICATION

This application claims priority to Chinese Patent Application No. CN202011409033.3, on file at the China National Intellectual Property Administration (CNIPA), having a filing date of Dec. 4, 2020, and having "METHOD, DEVICE AND COMPUTER PROGRAM PRODUCT FOR STORAGE MANAGEMENT" as a title, the contents and teachings of which are herein incorporated by reference in their entirety.

TECHNICAL FIELD

Embodiments of the present disclosure relate to the field of computers, and more particularly, to a storage management method, a device, and a computer program product.

BACKGROUND

With the development of data storage technologies, various data storage devices have been able to provide users with increasingly high data storage capabilities, and the data access speed has also been greatly improved. While data storage capabilities are improved, users also have increasingly high demands for data reliability and storage system response time.

At present, more and more storage systems use redundant arrays of independent disks (RAID) to provide storage with data redundancy. In the traditional solution, when a node writes to a stripe in the RAID, it needs to lock the stripe to prevent access conflicts with other nodes. However, this has an impact on RAID performance.

SUMMARY OF THE INVENTION

The embodiments of the present disclosure provide a solution for storage management.

According to a first aspect of the present disclosure, a storage management method is provided. The method includes: receiving from a requesting node a write request for writing target data into a first target storage space in a redundant array of independent disks (RAID), wherein the RAID is associated with a plurality of nodes and includes a stripe, the stripe includes a data storage space for storing data and a parity storage space for storing a plurality of parity values corresponding to the plurality of nodes, and the first target storage space is at least a part of the data storage space of the stripe; if a storage device associated with the first target storage space does not fail, acquiring first data stored in the first target storage space and a first parity value corresponding to the requesting node and stored in the parity storage space; determining a target parity value based on the target data, the first data, and the first parity value; and updating the stripe with the target data and the target parity value.

According to a second aspect of the present disclosure, an electronic device is provided. The device includes: at least one processing unit; and at least one memory, wherein the at least one memory is coupled to the at least one processing unit and stores instructions for execution by the at least one processing unit. When executed by the at least one processing unit, the instructions cause the device to perform actions, and the actions include: receiving from a requesting node a write request for writing target data into a first target storage space in a redundant array of independent disks (RAID), wherein the RAID is associated with a plurality of nodes and includes a stripe, the stripe includes a data storage space for storing data and a parity storage space for storing a plurality of parity values corresponding to the plurality of nodes, and the first target storage space is at least a part of the data storage space of the stripe; if a storage device associated with the first target storage space does not fail, acquiring first data stored in the first target storage space and a first parity value corresponding to the requesting node and stored in the parity storage space; determining a target parity value based on the target data, the first data, and the first parity value; and updating the stripe with the target data and the target parity value.

In a third aspect of the present disclosure, a computer program product is provided. The computer program product is tangibly stored in a non-transitory computer storage medium and includes machine-executable instructions, wherein when run in a device, the machine-executable instructions cause the device to perform any step of the method described according to the first aspect of the present disclosure.

The Summary of the Invention section is provided to introduce the choice of concepts in a simplified form, which will be further described in the following Detailed Description. The Summary of the Invention section is not intended to identify key features or essential features of the present disclosure, nor is it intended to limit the scope of the present disclosure.

BRIEF DESCRIPTION OF THE DRAWINGS

The above and other objectives, features, and advantages of the present disclosure will become more apparent by describing example embodiments of the present disclosure in detail with reference to the accompanying drawings, and in the example embodiments of the present disclosure, the same reference numerals generally represent the same components.

DETAILED DESCRIPTION

Figure 1:
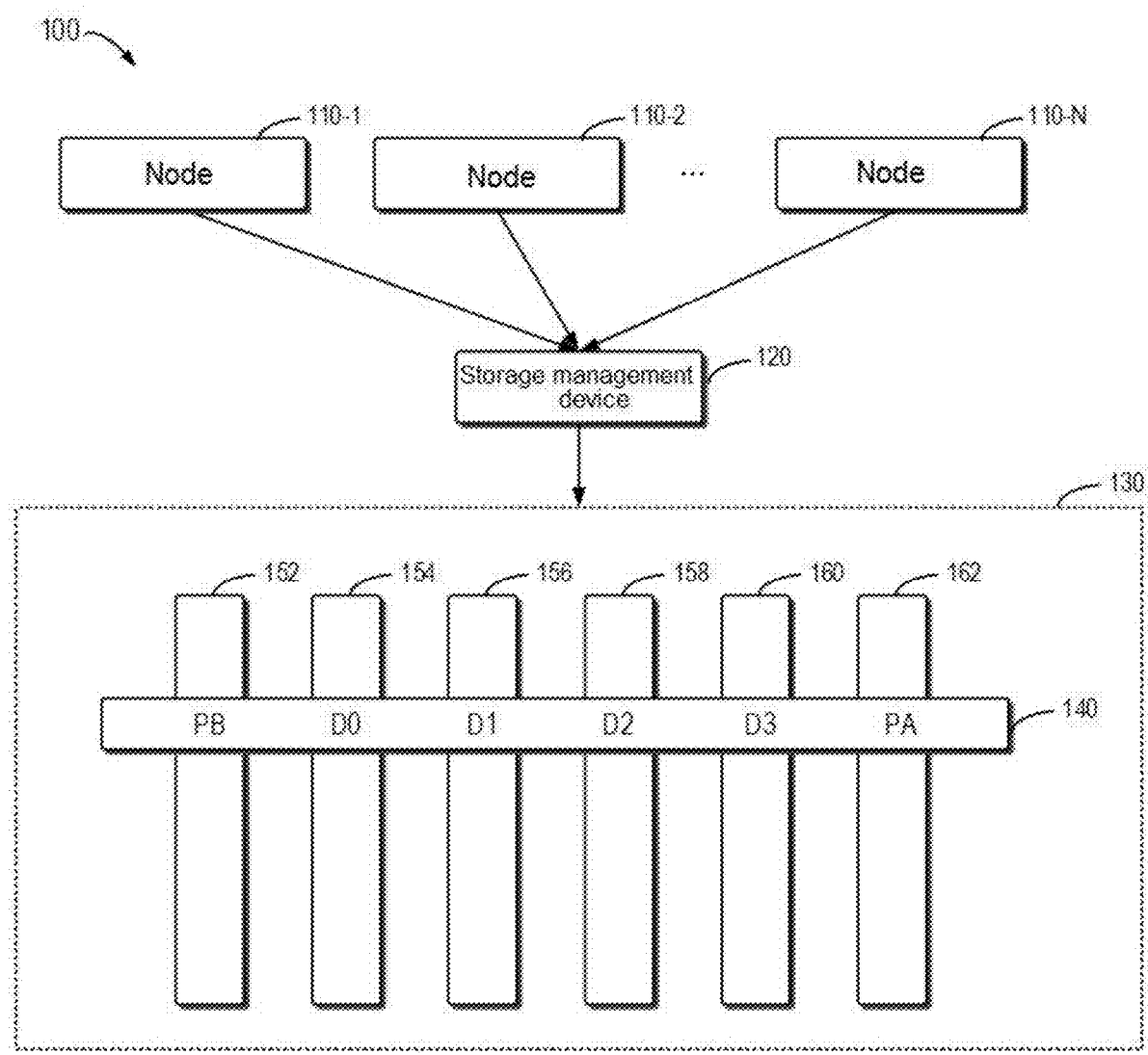
FIG. 1 illustrates a schematic diagram of an example environment in which the embodiments of the present disclosure may be implemented.

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided so that this disclosure will be more thorough and complete, and will fully convey the scope of the present disclosure to those skilled in the art.

As used herein, the term "including" and variations thereof mean open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first," "second," and the like may refer to different or the same objects. Other explicit and implicit definitions may also be included below.

In a RAID-based storage system, one RAID may include storage blocks from a plurality of storage disks, and the plurality of storage disks may also constitute a plurality of independent RAIDs. In the process of RAID-based data recovery, other storage blocks in the same RAID may be used to recover data of target storage blocks.

As discussed above, according to a conventional solution, when a stripe in a RAID is written by a node, the node not only needs to modify the written data part, but also needs to modify corresponding parity values. In the conventional solution, one stripe usually has only one parity value. Therefore, the node needs to lock the entire stripe during the writing process to prevent other nodes from accessing data of the stripe. However, some writings are often only for part of the data in the stripe, and such locking will affect the performance of the RAID.

According to the embodiments of the present disclosure, a storage management solution is provided. In this solution, when a write request for writing target data to a first target storage space in the RAID is received from a requesting node, it is determined whether a storage device associated with the first target storage space has not failed. If the storage device associated with the first target storage space does not fail, first data stored in the first target storage space and a first parity value corresponding to the requesting node and stored in a parity storage space are acquired. Then, a target parity value is determined based on the target data, the first data, and the first parity value, and the target data and the target parity value are used to update the stripe.

In this way, the embodiments of the present disclosure may assign corresponding parity values to different nodes. This can eliminate the need for a single node to lock other data spaces and other parity values when performing partial writes. Furthermore, the embodiments of the present disclosure can allow other nodes to execute write or read requests for other data spaces in parallel, thereby improving the efficiency of a storage system.

The solution of the present disclosure will be described below with reference to the accompanying drawings.

FIG. 1 illustrates example environment 100 in which the embodiments of the present disclosure may be implemented. As shown in FIG. 1, environment 100 includes storage management device 120 which is configured to manage RAID 130 coupled thereto. In addition, storage management device 120 may also be coupled with one or more nodes 110-1, 110-2 to 110-N (individually or collectively referred to as node 110) to receive an access request for RAID 130 from node 110.

Conventionally, RAID 130 may be organized into multiple stripes, and one stripe may span multiple storage devices. For example, in a conventional 4+1 RAID 5, one stripe may be associated with five different storage devices to store data in four storage devices and store parity values in one storage device.

As shown in FIG. 1, unlike the conventional 4+1 RAID 5, stripe 140 in RAID 130 may span six different storage devices, four of them (storage devices 154, 156, 158, and 160) are used for storing data, and two storage devices (storage devices 152 and 162) are used for storing the parity values.

In some implementations, the parity values may correspond to multiple nodes 110 one to one. For example, a parity value PA may correspond to node 110-1, and a parity value PB may correspond to node 110-2. It should be understood that the specific RAID types and the number of the parity values shown in FIG. 1 are only illustrative. Those skilled in the art can understand that a corresponding number of parity values may be set for any appropriate RAID type based on the number of nodes.

By setting multiple parity values in one stripe, the embodiments of the present disclosure can allow parallel access to the same stripe. The following will describe the access process of the RAID structure based on the multiple parity values in conjunction with FIGS. 2 to 5.

Figure 2:
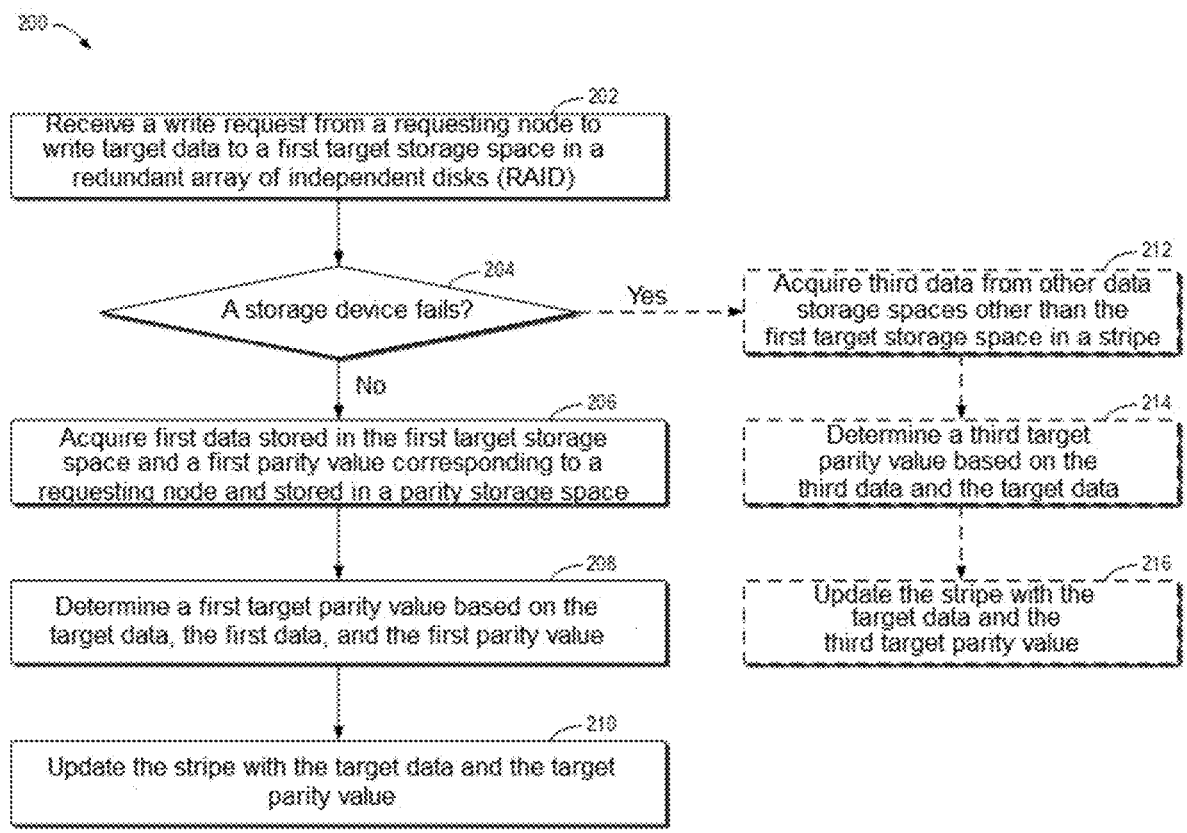
FIG. 2 illustrates a flowchart of a process for storage management according to an embodiment of the present disclosure.

FIG. 2 illustrates a flowchart of process 200 for storage management according to some embodiments of the present disclosure. Process 200 may be implemented, for example, by storage management device 120 shown in FIG. 1.

As shown in FIG. 2, in block 202, storage management device 120 receives a write request from a requesting node to write target data to a first target storage space in RAID 130, where RAID 130 is associated with multiple nodes 110 and includes stripe 140, stripe 140 includes a data storage space for storing data and a parity storage space for storing a plurality of parity values corresponding to a plurality of nodes, and the first target storage space is at least a part of the data storage space of the stripe.

Figure 3:
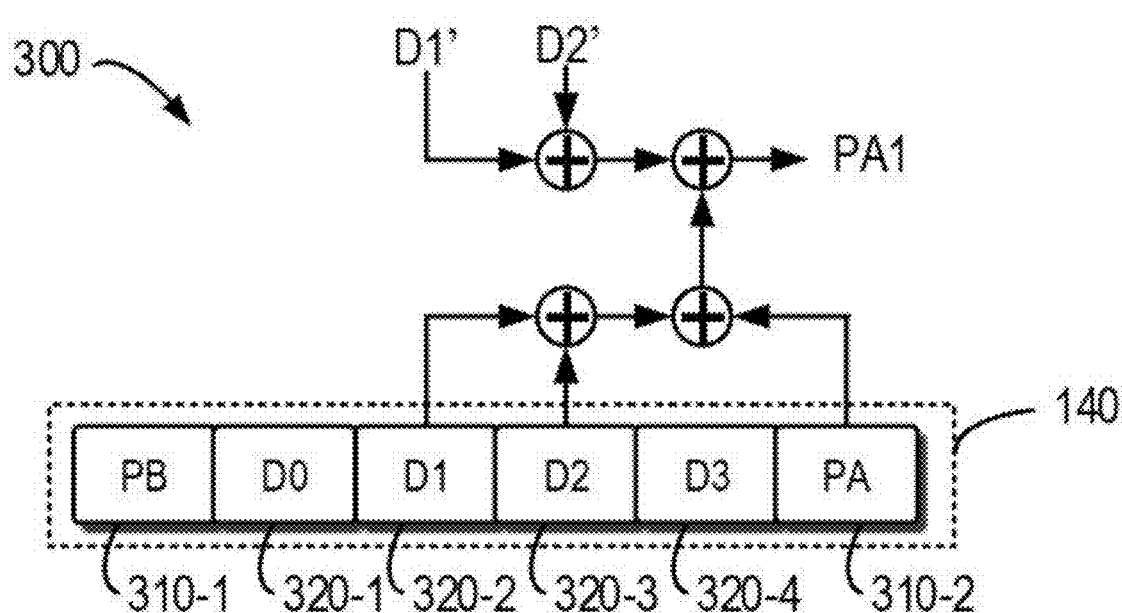
FIG. 3 illustrates a schematic diagram of storage management according to an embodiment of the present disclosure.

The process of block 202 will be described below in combination with FIG. 3. FIG. 3 illustrates schematic diagram 300 of storage management according to the embodiments of the present disclosure. As shown in FIG. 3, storage management device 120 may, for example, receive a write request from a requesting node (for example, node 110-1 in FIG. 1). The write request may be used, for example, to write target data "D1'" and "D2'" into corresponding target storage spaces 320-2 and 320-3.

As shown in FIG. 3, stripe 140 includes four data storage spaces 320-1, 320-2, 320-3, and 320-4 for storing data. In addition, stripe 140 also includes parity storage space 310-1 for storing a parity value PB and parity storage space 310-2 for storing a parity value PA.

Additionally, the parity value "PA" may be associated with node 110-1, and the parity value "PB" may be associated with node 110-2, for example. When stripe 140 is initialized, all data storage spaces and parity storage spaces in stripe 140 may be set to initial values (for example, 0).

In block 204, storage management device 120 determines whether a storage device associated with the first target storage space has failed. If the storage device has not failed, process 200 proceeds to block 206. In block 206, storage management device 120 acquires the first data stored in the first target storage space and the first parity value corresponding to the requesting node and stored in the parity storage space.

It should be understood that the storage device having not failed described here may mean that an entire storage disk corresponding to the storage space has not failed, or that a physical storage block corresponding to the storage space has not failed. Storage management device 120 may acquire operating information of a storage disk corresponding to RAID 130 to determine whether the corresponding storage device fails.

Continuing with the example of FIG. 3, storage management device 120 may determine that storage device 156 corresponding to storage space 320-2 and storage device 158 corresponding to storage space 320-3 have not failed. Subsequently, storage management device 120 may acquire first data "D1" and "D2" stored in storage space 320-2, and acquire the first parity value "PA" corresponding to node 110-1 and stored in parity storage space 310-2.

Continuing to refer to FIG. 2, in block 208, storage management device 120 determines a first target parity value based on the target data, the first data, and the first parity value. In some implementations, storage management device 120 may determine the target parity value based on an exclusive OR operation on the target data, the first data, and the first parity value.

In the example of FIG. 3, storage management device 120 may, for example, determine the first target parity value "PA1" based on the exclusive OR operation on the target data "D1'" and "D2'," the first data "D1" and "D2" and the first parity value "PA", and the first target parity value "PA1" may, for example, be determined according to formula (1):

$$PA1=D1'\oplus D2'\oplus D1\oplus D2\oplus PA \qquad (1)$$

Where $\oplus$ means exclusive OR operation.

Continuing to refer to FIG. 2, in block 210, storage management device 120 uses the target data and the target parity value to update the stripe. Specifically, storage management device 120 may write the target data into the first target storage space and replace the first parity value with the first target parity value.

Continuing with the example of FIG. 3, storage management device 120 may write the target data "D1'" and "D2'" into corresponding storage spaces 320-2 and 320-3, and write the determined first target parity value "PA1" into parity storage space 310-2 to replace the first parity value "PA."

In the above process, storage management device 120 does not need to lock unaccessed data storage spaces and parity storage spaces for other nodes. For example, in the example of FIG. 3, other nodes 110 may still perform reading or writing to data storage spaces 320-1 and/or 320-4.

As an example, another node 110-2 may write to data storage space 320-1 in parallel, and update the parity value "PB" corresponding to node 110-1 based on the same method as process 200.

Based on the method discussed above, by setting multiple parity values associated with different nodes, the embodiments of the present disclosure can allow different nodes to initiate access requests to different data storage spaces of the same stripe in parallel without causing conflict. In this way, the performance of the RAID can be improved.

Figure 4:
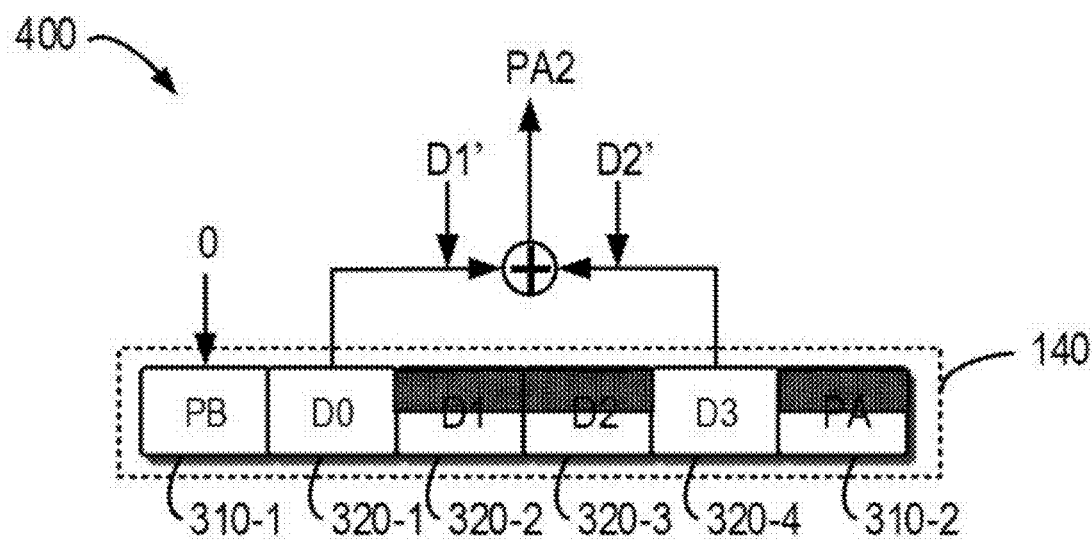
FIG. 4 illustrates a schematic diagram of error handling according to an embodiment of the present disclosure.

In some implementations, an error may occur when storage management device 120 writes the target data to the target storage space. FIG. 4 illustrates schematic diagram 400 of error handling according to an embodiment of the present disclosure.

As shown in FIG. 4, target storage space 320-2 and target storage space 320-3 have been partially updated, but the writing of the target data fails. In this case, storage management device 120 may re-determine a second target parity value PA2.

In some implementations, storage management device 120 may acquire second data from other data storage spaces than the first target storage space in the stripe. Specifically, as shown in FIG. 4, storage management device 120 may acquire data "D0" in data storage space 320-1 and data "D3" in data storage space 320-4.

Additionally, storage management device 120 may determine the second target parity value based on the second data and the target data. As shown in FIG. 4, storage management device 120 may determine the second target parity value "PA2" based on exclusive OR operation on the target data "D1'" and "D2'," the data "D0" in data storage space 320-1, and the data "D3" in data storage space 320-4. The second target parity value "PA2" may, for example, be determined according to formula (2):

$$PA1=D1'\oplus D2'\oplus D0\oplus D3 \qquad (2)$$

In some implementations, storage management device 120 may use the target data and the second target parity value to update stripe 140 again. Taking FIG. 4 as an example, storage management device 120 may continue to write the target data "D1'" and "D2'" into target storage spaces 320-2 and 320-3, and write the re-determined second target parity value "PA2" into parity storage space 310-2.

In some implementations, in order to ensure that the exclusive OR value of all stored data and all parity data is 0, storage management device 120 may also set parity values associated with other nodes among the plurality of parity values to the initial value. For example, storage management device 120 may set the parity value "PB" stored in parity storage space 310-1 to 0.

In some implementations, in the event of a failure, storage management device 120 needs to lock the stripe to prevent other nodes from modifying other parity data or the second data.

In some implementations, if a storage device associated with other data storage spaces than the first target storage space in stripe 140 fails, storage management device 120 may record the target data and the first parity value in a log before completing updating of stripe 140. In this way, even if an additional storage device fails, storage management device 120 can recover the data from the log information, thereby ensuring data security.

Figure 5:
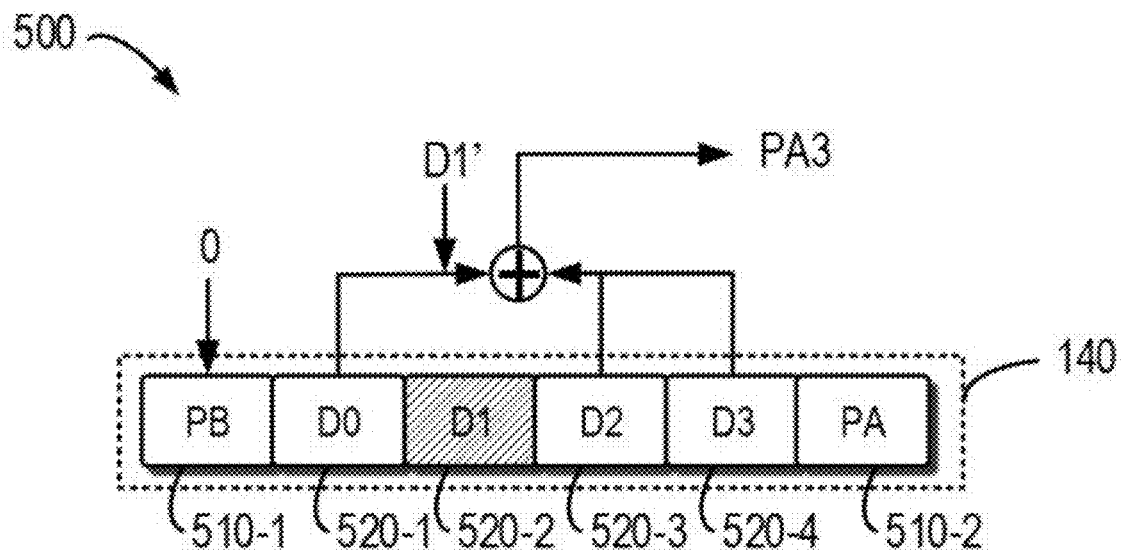
FIG. 5 illustrates a schematic diagram of storage management according to another embodiment of the present disclosure.

Continuing to refer to FIG. 2, if it is determined that the storage device associated with the first target storage space fails in block 204, process 200 proceeds to block 212. In block 212, storage management device 120 may acquire third data from other data storage spaces than the first target storage space in the stripe. The process of block 212 will be described below in combination with FIG. 5. FIG. 5 illustrates schematic diagram 500 of storage management according to yet another embodiments of the present disclosure.

As shown in FIG. 5, storage management device 120 may, for example, receive a request from node 110-1 to write the target data "D1'" into target storage space 520-2. For example, storage management device 120 may determine that a storage device associated with target storage space 520-2 has failed, and may acquire the data "D0" in data storage space 520-1, the data "D2" in data storage space 520-3, and the data "D3" in data storage space 520-4.

In block 214, storage management device 120 may determine a third target parity value based on the second data and the target data. Specifically, storage management device 120 may determine the third target parity value based on exclusive OR operation on the second data and the target data. Continuing with the example of FIG. 5, storage management device 120 may determine the third target parity value "PA3" based on the data "D0" in storage space 520-1, the data "D2" in data storage space 520-3, the data "D3" in data storage space 520-4, and the target data "D1'." The third target parity value "PA3" may, for example, be determined according to formula (3):

$$PA3=D1'\oplus D0\oplus D2\oplus D3 \quad (3)$$

In block 216, storage management device 120 may update the stripe with the target data and the third target parity value. For example, in the example of FIG. 5, storage management device 120 may write the target data "D1'" to the storage space that has not failed, and write the third target parity value to parity storage space 510-2, and thus, updating of stripe 140 is completed.

In some implementations, in order to ensure that the exclusive OR value of all stored data and all parity data is 0, storage management device 120 may also set parity values associated with other nodes among the plurality of parity values to the initial value. For example, after writing the target data and the third target parity value, storage management device 120 may set the parity value "PB" stored in parity storage space 310-1 to 0.

In some implementations, in order to prevent other storage devices from causing data loss due to failure, storage management device 120 may also record the target data and the first parity value in the log before completing updating of stripe 140.

Figure 6:
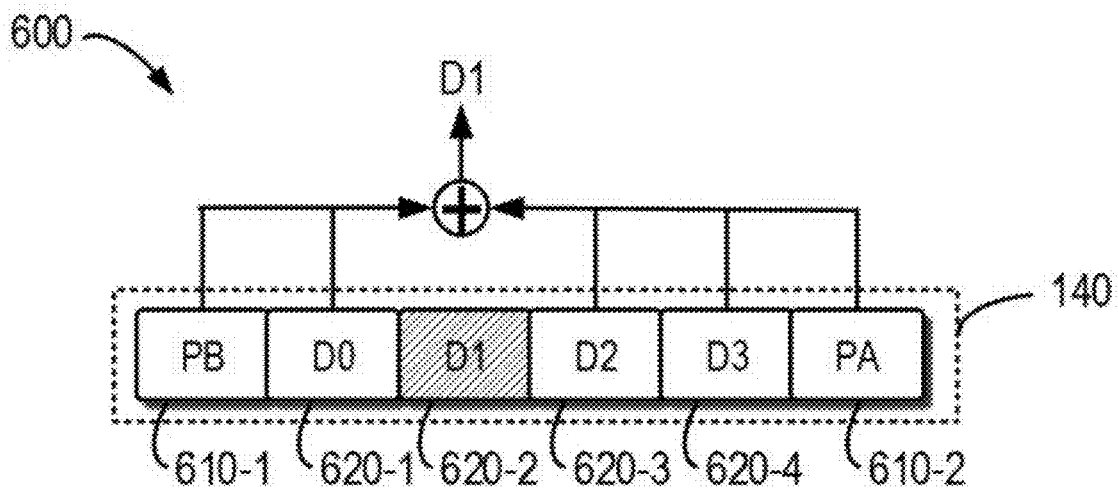
FIG. 6 illustrates a schematic diagram of storage management according to yet another embodiment of the present disclosure.

In some implementations, storage management device 120 may also respond to a read request. FIG. 6 illustrates schematic diagram 600 of storage management according to yet another embodiment of the present disclosure.

As shown in FIG. 6, storage management device 120 may receive a read request to read data from the second target storage space of the stripe. For example, storage management device 120 may receive the read request from node 110-1 to read data from data storage space 620-2 in stripe 140.

In some implementations, if the storage device associated with the second target storage space fails, storage management device 120 may acquire fourth data from other data storage spaces than the second target storage space in stripe 140. Taking FIG. 6 as an example, storage management device 120 may acquire data "D0" in data storage space 620-1, data "D2" in 620-3, and data "D3" in 620-4, as well as multiple parity values "PA" and "PB."

In some implementations, storage management device 120 may then restore the data in the second target storage space based on the fourth data and the multiple parity values, and provide the restored data as a response to the read request. Continuing with the example of FIG. 6, storage management device 120 may acquire the data "D0" in data storage space 620-1, the data "D2" in 620-3, and the data "D3" in 620-4, as well as the multiple parity values "PA" and "PB" to restore the data "D1" stored in data storage space 620-2. The data "D1" may, for example, be determined according to formula (4):

$$D1=PA\oplus PB\oplus D0\oplus D2\oplus D3 \quad (4)$$

It should be understood that the data reconstruction process is similar to the data recovery process, which can use data in other data storage spaces and multiple parity values to perform data reconstruction, and the specific process will not be described in detail here.

Figure 7:
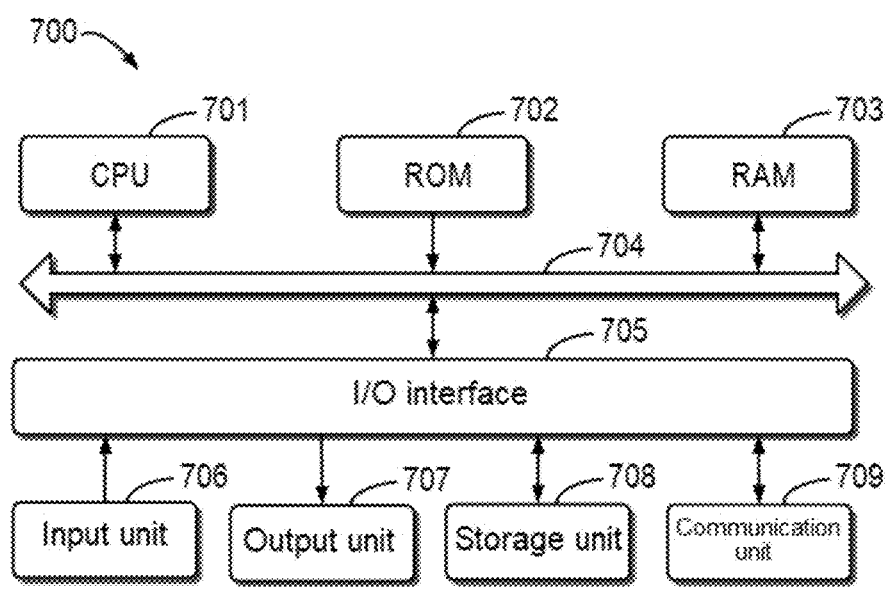
FIG. 7 illustrates a schematic block diagram of an example device that may be configured to implement the embodiments of the present disclosure.

FIG. 7 illustrates a schematic block diagram of example device 700 that can be configured to implement an embodiment of the present disclosure. For example, storage management device 120 according to the embodiments of the present disclosure may be implemented by device 700. As shown in the figure, device 700 includes central processing unit (CPU) 701, which may perform various appropriate actions and processing according to computer program instructions stored in read only memory (ROM) 702 or computer program instructions loaded into random access memory (RAM) 703 from storage unit 708. Various programs and data required for operations of device 700 may also be stored in RAM 703. CPU 701, ROM 702, and RAM 703 are connected to each other through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices via a computer network such as the Internet and/or various telecommunication networks.

The various processes and processing described above, for example, method 200 and/or method 700, may be performed by processing unit 701. For example, in some embodiments, process 200 may be implemented as a computer software program that is tangibly included in a machine-readable medium, for example, storage unit 708. In some embodiments, part or all of the computer program may be loaded and/or installed on device 700 via ROM 702 and/or communication unit 709. When the computer program is loaded into RAM 703 and executed by CPU 701, one or more actions of process 200 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device (for example, a punch card or a raised structure in a groove with instructions stored thereon), and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user computer through any type of network, including a local area network (LAN) or a wide area network (WAN), or may be connected to an external computer (e.g., connected through the Internet using an Internet service provider). In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block in the flowcharts and/or block diagrams as well as a combination of blocks in the flowcharts and/or block diagrams may be implemented using computer-readable program instructions.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It also should be noted that each block in the block diagrams and/or flowcharts and a combination of blocks in the block diagrams and/or flowcharts may be implemented using a dedicated hardware-based system for executing specified functions or actions, or may be implemented using a combination of dedicated hardware and computer instructions.

Various implementations of the present disclosure have been described above. The foregoing description is illustrative rather than exhaustive, and is not limited to the disclosed implementations. Numerous modifications and changes are apparent to those of ordinary skill in the art without departing from the scope and spirit of the various illustrated implementations. The selection of terms as used herein is intended to best explain the principles and practical applications of the various implementations or technical improvements of technologies on the market, or to enable other persons of ordinary skill in the art to understand the implementations disclosed herein.

The invention claimed is:

1. A storage management method, comprising:
receiving, from a requesting node, a write request for writing target data into a first target storage space in a redundant array of independent disks (RAID), wherein the RAID is associated with a plurality of nodes and comprises a stripe, the stripe comprises a data storage space for storing data and a parity storage space for storing a plurality of parity values corresponding to the plurality of nodes, and the first target storage space is at least a part of the data storage space of the stripe;
if a storage device associated with the first target storage space does not fail, acquiring first data stored in the first target storage space and a first parity value corresponding to the requesting node and stored in the parity storage space;
determining a target parity value based on the target data, the first data, and the first parity value;
updating the stripe with the target data and the target parity value; and
recording the target data and the first parity value in a log before completing updating of the stripe.

2. The method according to claim 1, wherein updating the stripe with the target data and the target parity value comprises:
  writing the target data to the first target storage space; and
  replacing the first parity value by the first target parity value.

3. The method according to claim 2, further comprising:
  if the writing of the target data fails and the first target storage space has been partially updated, determining a second target parity value; and
  updating the stripe again with the target data and the second target parity value.

4. The method according to claim 3, wherein determining the second target parity value comprises:
  acquiring second data from other data storage spaces than the first target storage space in the stripe; and
  determining the second target parity value based on the second data and the target data.

5. The method according to claim 3, further comprising:
  setting a parity value associated with other nodes among the plurality of parity values as an initial value.

6. The method according to claim 1, wherein the target parity value is a first target parity value, and the method further comprises:
  if the storage device associated with the first target storage space fails, acquiring third data from other data storage spaces than the first target storage space in the stripe;
  determining a third target parity value based on the third data and the target data; and
  updating the stripe with the target data and the third target parity value.

7. The method according to claim 6, further comprising:
  setting a parity value associated with other nodes among the plurality of parity values as an initial value.

8. The method according to claim 1, wherein recording the target data and the first parity value in the log includes:
  due to a storage device associated with other data storage spaces than the first target storage space in the stripe failing, placing the target data and the first parity value in the log before completing updating of the stripe.

9. The method according to claim 1, further comprising:
  receiving a read request for reading data from a second target storage space of the stripe;
  if a storage device associated with the second target storage space fails, acquiring fourth data from other data storage spaces than the second target storage space in the stripe;
  recovering data in the second target storage space based on the fourth data and the parity value; and
  providing the recovered data as a response to the read request.

10. An electronic device, comprising:
  at least one processing unit; and
  at least one memory coupled to the at least one processing unit and storing instructions for execution by the at least one processing unit, wherein the instructions, when executed by the at least one processing unit, cause the device to perform actions comprising:
    receiving, from a requesting node, a write request for writing target data into a first target storage space in a redundant array of independent disks (RAID), wherein the RAID is associated with a plurality of nodes and comprises a stripe, the stripe comprises a data storage space for storing data and a parity storage space for storing a plurality of parity values corresponding to the plurality of nodes, and the first target storage space is at least a part of the data storage space of the stripe;
    if a storage device associated with the first target storage space does not fail, acquiring first data stored in the first target storage space and a first parity value corresponding to the requesting node and stored in the parity storage space;
    determining a target parity value based on the target data, the first data and the first parity value; and
    updating the stripe with the target data and the target parity value; and
    recording the target data and the first parity value in a log before completing updating of the stripe.

11. The device according to claim 10, wherein updating the stripe with the target data and the target parity value comprises:
  writing the target data to the first target storage space; and
  replacing the first parity value by the first target parity value.

12. The device according to claim 11, wherein the actions further comprise:
  if the writing of the target data fails and the first target storage space has been partially updated, determining a second target parity value; and
  updating the stripe again with the target data and the second target parity value.

13. The device according to claim 12, wherein determining the second target parity value comprises:
  acquiring second data from other data storage spaces than the first target storage space in the stripe; and
  determining the second target parity value based on the second data and the target data.

14. The device according to claim 12, wherein the actions further comprise:
  setting a parity value associated with other nodes among the plurality of parity values as an initial value.

15. The device according to claim 10, wherein the target parity value is a first target parity value, and the actions further comprise:
  if the storage device associated with the first target storage space fails, acquiring third data from other data storage spaces than the first target storage space in the stripe;
  determining a third target parity value based on the third data and the target data; and
  updating the stripe with the target data and the third target parity value.

16. The device according to claim 15, wherein the actions further comprise:
  setting a parity value associated with other nodes among the plurality of parity values as an initial value.

17. The device according to claim 10, wherein recording the target data and the first parity value in the log includes:
  due to a storage device associated with other data storage spaces than the first target storage space in the stripe failing, placing the target data and the first parity value in the log before completing updating of the stripe.

18. The device according to claim 10, wherein the actions further comprise:
  receiving a read request for reading data from a second target storage space of the stripe;
  if a storage device associated with the second target storage space fails, acquiring fourth data from other data storage spaces than the second target storage space in the stripe;
  recovering data in the second target storage space based on the fourth data and the parity value; and providing the recovered data as a response to the read request.

19. A computer program product having a non-transitory computer readable medium which stores a set of instructions to perform storage management; the set of instructions, when carried out by computerized circuitry, causing the computerized circuitry to perform a method of:
   receiving, from a requesting node, a write request for writing target data into a first target storage space in a redundant array of independent disks (RAID), wherein the RAID is associated with a plurality of nodes and comprises a stripe, the stripe comprises a data storage space for storing data and a parity storage space for storing a plurality of parity values corresponding to the plurality of nodes, and the first target storage space is at least a part of the data storage space of the stripe;
   if a storage device associated with the first target storage space does not fail, acquiring first data stored in the first target storage space and a first parity value corresponding to the requesting node and stored in the parity storage space;
   determining a target parity value based on the target data, the first data, and the first parity value;
   updating the stripe with the target data and the target parity value; and
   recording the target data and the first parity value in a log before completing updating of the stripe.

20. The method according to claim 1, wherein the plurality of nodes includes the requesting node and a second node;
   wherein the plurality of parity values corresponding to the plurality of nodes includes the first parity value corresponding to the requesting node and a second parity value corresponding to the second node; and
   wherein updating the stripe with the target data and the target parity value includes replacing the first parity value with the target parity value without changing the second parity value.

21. The method according to claim 1, further comprising:
   recovering the target data from the log after failure of a storage device of the RAID.

* * * * *